United States Patent [19]

Carle

[11] 4,088,581
[45] May 9, 1978

[54] DEVICE FOR THE CONTINUOUS FILTRATION UNDER PRESSURE OF SOLID MATERIALS CONTAINED IN LIQUIDS

[75] Inventor: Jean-Claude Alfred Carle, Viry Noureuil, France

[73] Assignee: Societe anonyme des Fonderies et Ateliers L. Choquenet, Chauny, France

[21] Appl. No.: 656,537

[22] Filed: Feb. 9, 1976

[30] Foreign Application Priority Data

Feb. 12, 1975 France .............................. 75 04343

[51] Int. Cl.² ....................... B01D 33/14; B01D 33/36
[52] U.S. Cl. .................................. 210/391; 210/396; 210/401; 210/403
[58] Field of Search .............................. 210/400–405, 210/390, 396, 455, 77, 79, 386, 391; 162/348; 209/307; 100/118, 151–153

[56] References Cited

U.S. PATENT DOCUMENTS

| | | | |
|---|---|---|---|
| 3,263,816 | 8/1966 | Krynski | 210/401 |
| 3,375,932 | 4/1968 | Ishigaki | 210/390 |
| 3,570,674 | 3/1971 | Dahlem | 210/400 |
| 3,897,341 | 7/1975 | Ozawa | 210/401 X |

FOREIGN PATENT DOCUMENTS

1,035,620  8/1958  Germany .......................... 210/401

Primary Examiner—William A. Cuchlinski, Jr.

[57] ABSTRACT

Continuous filtration under pressure is obtained by combination of a looped filter belt and an alveolar belt which are caused to cooperate with a rotary distributor drum. The belts are compressed against the drum through application onto the belts of an external pressure which is at least equal to the filtration pressure but which is exerted on a surface which is larger than that onto which the filtration pressure is exerted.

16 Claims, 5 Drawing Figures

DEVICE FOR THE CONTINUOUS FILTRATION UNDER PRESSURE OF SOLID MATERIALS CONTAINED IN LIQUIDS

The technical field of the invention is that of filtration.

Filtration of solid materials contained, in particular, as a suspension in a liquid, aims mainly to give, on the one hand, a clear liquid and, on the other hand, cakes in which the solid substances are brought together. Such a result is already obtained with discontinuous operation filter-presses.

Various filtration means are also known which are used for the separation of solids and liquids loaded with these and in particular:

— arrangements in which a depression is created on one side of a filtering component opposite that which is bathed by a loaded liquid such as continuous filters operating under vacuum;
— arrangements in which the expulsion of the liquid phase is effected across a filtering component by a decrease of the volume of liquid to be filtered such as is the case in continuous filters with filtering belts, whether said belts are horizontal or vertical;
— arrangements in which the liquid to be filtered is introduced under pressure in an enclosure inside of which some of the walls at least are provided with filtering components so that the liquid phase crosses the latter, whereas the solid materials are retained and form either a sludge, such as is the case in continuous filters under pressure, or cakes the drying of which is effected as far as possible, such as is the case in discontinuous operation filter-presses.

Among these various means, only the discontinuous filter-press makes it possible to obtain very dry cakes, filtration being carried out under high pressures up to and exceeding 25 bars.

One of the objects of this invention is to provide results comparable to those of discontinuous operation filter-presses but using a continuous and automatic filtering system under high pressures.

Another object of the invention is to obtain a quick and automatic formation and discharge of cakes which may be of small thickness in which case the rate may be increased but which is particularly valuable for sludges which are difficult to filter and in particular waste sludges in scrubbing plants.

The invention relates in this respect to a filtration device comprising an endless belt with filtering alveoles, locally applied onto a feeding drum moving with said belt and means for the application of the latter onto said drum through an external pressure which ensures the compression of the bearing of said alveoles onto said drum.

This external pressure is applied onto a surface which is larger than that providing contact between the belt and drum, so that it is sufficient that said external pressure be equal to the filtration pressure.

Preferably, this external pressure is applied to the belt through multiple transfer rollers.

This external pressure may be generated by a mechanical stress applied to a collar carrying transfer rollers or through the introduction of a fluid under pressure in a tight jacket interposed between the collar and the framework of the mechanism or through both of these means.

According to a desirable embodiment, the collar having the rollers surrounds a part of the periphery of the drum, and is fastened to the framework at one of its ends and is coupled to the other one with a pulling system. This solution is particularly valuable for small sized filters which may operate under relatively low filtration pressures.

According to a desirable embodiment, the endless filtration belt is caused to follow a looped path which comprises a partial jacketing advance of the drum and a return path at a distance from the latter. The belt is accompanied by a filter cloth which also has a looped path which follows a course separate from that of said belt, outside the hold of the latter on said drum so that on this path, cloth treatment means may be provided which comprise at least one scraping station and one unplugging station, which may comprise washing of the cloth.

Still according to the same embodiment, on the paths of the belt and cloth falling outside the hold of the drum there may be conveniently provided loop returns and stretching arrangements.

Furthermore, at the level of the drum itself, distribution means are provided which determine the admittance of loaded liquid to the different filtering alveoles with corresponding valves and their control components, especially using compressed gas, corresponding rotary sealed junctions and also a scraping device for the drum acting on the latter in the external interval to this hold.

Close to a side of the drum, there is provided a collecting gutter for the clear filtered liquid, brought to said gutter through passage into the latter, of pipes which are laterally associated with said belt adjacent each alveole.

The assembly is thus provided as a rotary machine comprising a rotor formed by the drum and a stator consisting of a framework partially jacketing the drum and leaving an air gap for the passage of said belt and said cloth, the collar with transfer rollers associated with these means for the compression of the belt and cloth onto the drum being located outside said passage.

An efficient and very compact assembly is thus obtained which makes it possible to carry out the most difficult filtrations rapidly and with a high yield.

The following description with reference to the appended drawings, given as non limiting examples, will make it possible to more fully understand the practice of the invention.

Figure 2:
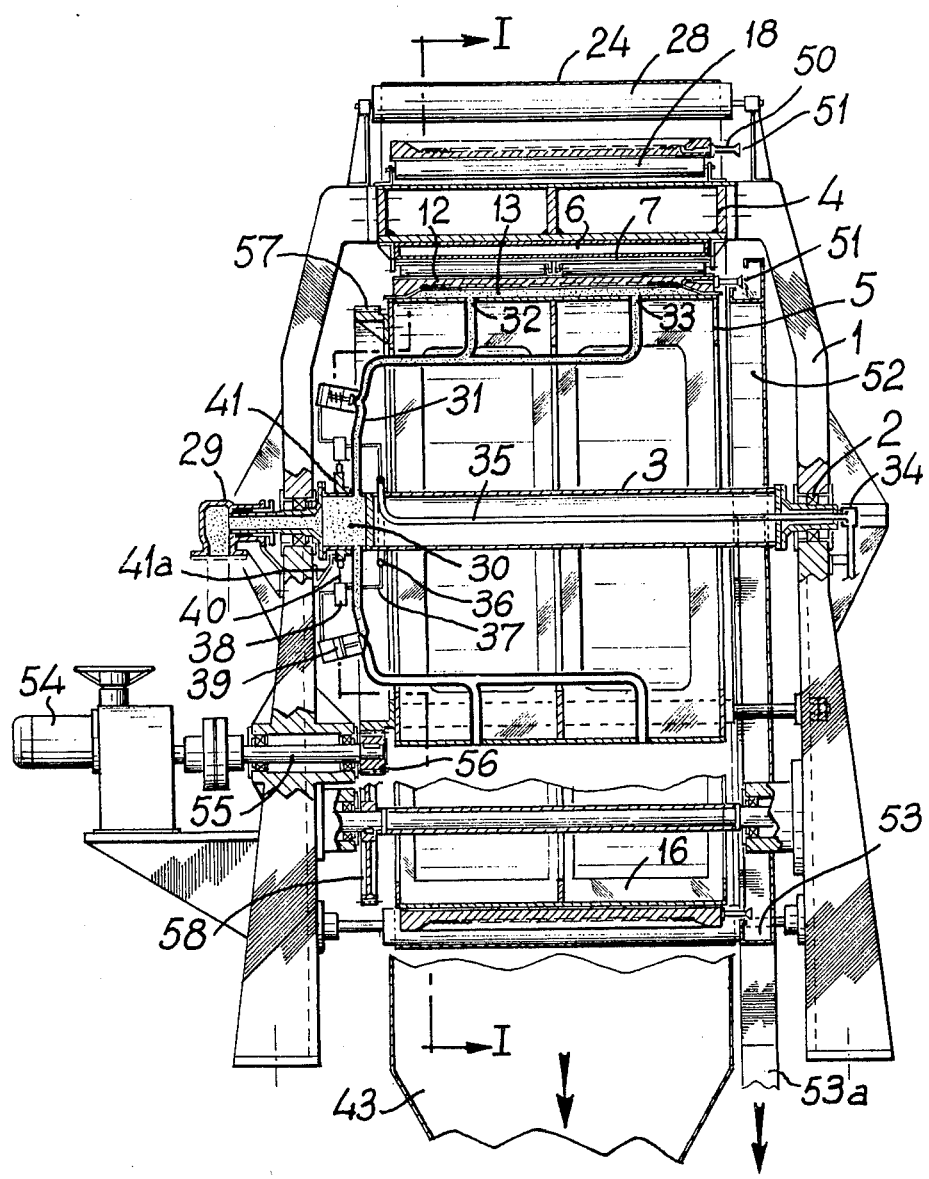
FIG. 2 shows a section along the broken line II—II of FIG. 1.
Figure 3:
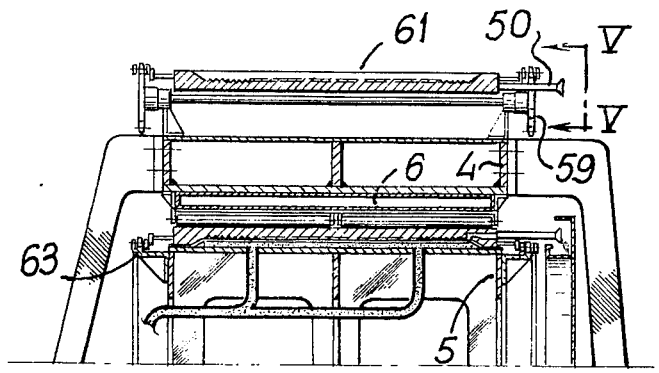

FIG. 3 partially shows, in a manner similar to that of FIG. 2, a varying embodiment in which the filtration belt consists of a series of plates mounted on lateral chains.

Figure 4:
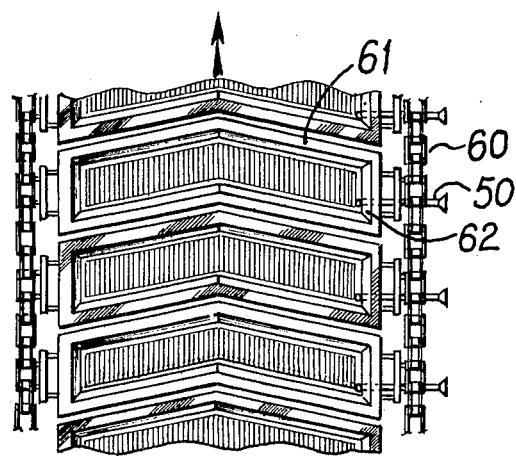

FIG. 4 shows, in development, such a belt with plates in a herring-bone pattern.

Figure 5:
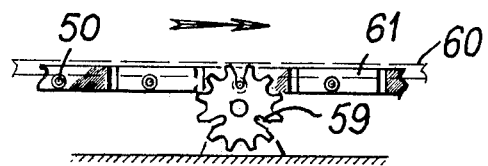

FIG. 5 shows a side elevation of a passage on pinions of link axes of such a chain and clear liquid evacuation pipes.

Figure 1:
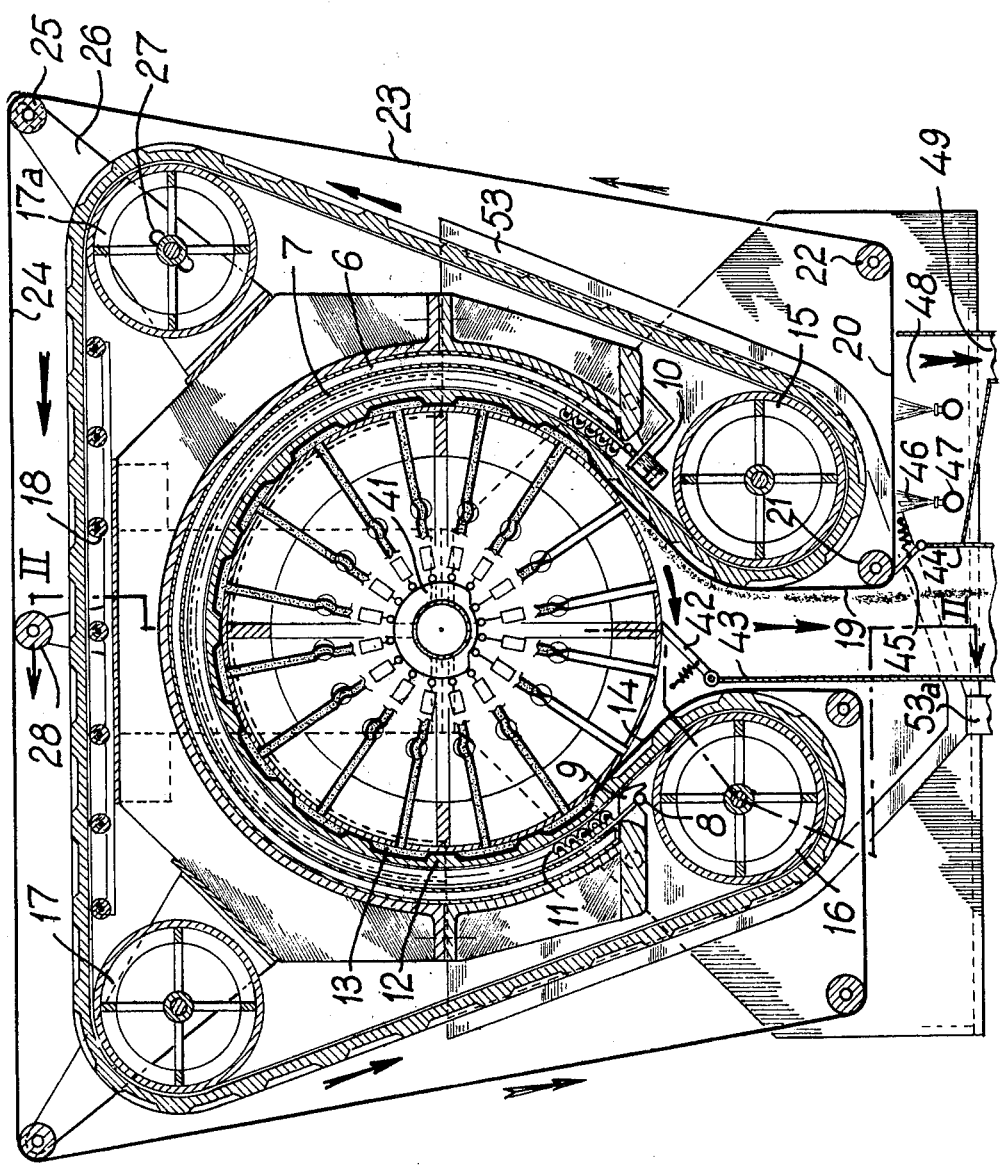
FIG. 1 shows a side elevation of a filtration device as a section along the broken line I—I of FIG. 2.

As shown in FIGS. 1 and 2, ribs 1 are provided forming a two legged lateral support sustaining a bearing 2 for a drumm shaft 3 and an intermediate stator 4. The stator in two parts, united by a diametrical connection and jackets an interior drum 5 carried by the shaft 3. This jacketing of drum 5 by stator 4 is distributed symmetrically with respect to a vertical radial plane onto approximately three quarters of the periphery of the drum.

Between the smooth surfaces opposite drum 5 and stator 4, is placed a tight and expansible jacket 6 connected in a manner not shown to a source of fluid under pressure. Inside this jacket 6, there appears a collar 7 which also jackets the drum. This collar consists, in particular, of a flexible and elastic sheet of steel attached in a hinged manner at one of its ends through a pivot 8 passed under hooks 9 to an end corresponding to the lower part of stator 4, whereas the other end of the sheet is further connected to the piston rod or piston rods of one or more jacks 10 which places putting under stress. The body or bodies of the piston rods are mounted facing the lower end opposite said stator. On the inside, the collar is provided with transfer rollers 11 which are approximately contiguous and are provided with end link-pins mounted in the brackets forming bearings, provided on the inside with the collar involved.

In the air-gap which remains, between the periphery of drum 5 and transfer rollers 11, there passes a filtration belt 12 which has, opposite drum 5, filtration alveoles 13 which are regularly distributed over the length of belt 12. Each hollow alveole comprises a bottom provided with ribs and grooves and is edged with a contact tight peripheral flange on the outside wall of the drum. This belt and especially the rims involved are flexible and elastic and consist of any desired material or complex.

Between belt 12 and the periphery of drum 5, there also passes a filtration cloth 14.

Belt 12 and cloth 14, on either side of the zone which has a hold on drum 5, pass on coupling shafts 15 and 16 from which diverging paths appear. For belt 12, these paths lead to upper coupling shafts 17 and 17a which are spaced apart. The upper horizontal path of the belt between coupling shafts 17 and 17a is supported by a series of rollers 18.

For cloth 14, after passage at the periphery of the reversing shaft couplings 15 and 16, there are formed vertical paths 19 and then horizontal paths 20, through passage on bevel gear rollers 21. After passage on a second bevel gear roller 22, there appear diverging paths 23, united by an upper horizontal path 24 between bevel gear rollers 25.

The coupling shaft 17a and one of the bevel gear rollers 25 are mounted through bearings on a supporting arm 26, and are integral with stator 4. Such bearings slide into slots such as 27 of an arm in order to ensure the correct placement under stress of belt 12 and cloth 14. On the upper horizontal path of the cloth, a support can be provided by means of an intermediate roller 28.

As far as admittance of the loaded liquid to the various alveoles is concerned, one of the tips of shaft 3 of drum 5 is provided with a tight rotating connection 29 for bringing said liquid to a chamber 30 at the end of the shaft, to which are connected radial pipes 31 leading to offtakes 32, 33 in the peripheral wall of drum 5. The distribution of pipes 31 and the pitch of offtakes 32, 33 are equal to those of alveoles 13 coming into contact through their peripheral rims with the wall of the drum.

In order to ensure distribution, the other end of shaft 3 is provided with a rotating tight connection 34 for bringing compressed air to an axial pipe 35, which feeds a distributor 36 from which the compressed air pipes 37 leave. Each pipe 37 is connected to a valve 38 designed to feed the control cylinder of a gate 39 carried by a radial pipe 31. Each valve is actuated by a push-rod 40 the end of which is carried on a cam 41 attached on a rib 1.

It is thus possible, in succession, to actuate the gates 39 in order to stop the output of loaded liquid at the level of offtakes 32, 33 when said offtakes are not covered by alveoles 13 or, on the contrary, let them discharge the loaded liquid into the alveoles which are in tight contact with drum 5.

On the periphery of this drum, in a location free from contact between the drum, the cloth and the belt, there is a scraper 42 shaped as a hinged blade urged back upon contact with this drum by a spring. This scraper is located, in addition, in the space included between the two vertical paths 19 of cloth 14 so that the solids loosened may fall by gravity into the disposal chute provided for that purpose. This blade 42 can be mounted on top of a wall 43 which limits laterally this chute on one side. Wall 44 opposite this chute is located in a staggered manner beyond the vertical position of roller 21 and it carries on top a similar scraping blade 45 which acts on cloth 14 upon its passage on roller 21 in order to unloosen the remaining solids which may be adhering to it.

Liquid jets 46 strike the horizontal path 20 between roller 21 and roller 22 designed to clean and unplug, these jets being supplied by nozzles carried on units 47 contained in a tank 48 designed to collect residual solids; this tank is provided with a disposal pipe 49 returning this loaded liquid, for example, as a mixture with the liquid to be filtered. Once it has passed above this tank, cloth 14 arrives on roller 22 sufficiently cleaned and unplugged.

The device thus described operates as follows: As soon as a given alveole in belt 12 is applied in a tight manner through its peripheral twisting and through cloth 14 which covers it against the external wall of drum 5, the corresponding offtakes 32 and 33 discharge a loaded liquid, the corresponding gate 39 being opened to compressed air introduced through the opening of valve 38, under the action of the passage of its push-rod onto cam 41 which is maintained in a fixed position by a catch 41a integral with one of its legs. Gate 39 is thus maintained open up to the moment which precedes the raising of this belt and of this cloth out of contact with drum 5, i.e., when the assembly comprising the belt and cloth leaving this drum 5 passes around the exit coupling shaft 15.

During the admittance of the liquid to be filtered under pressure, cloth 14 molds itself in depth into the alveole. As soon as the pressure is released, the cloth returns to a planar configuration under its stress which causes the disintegration of the cake that has collected there. Simultaneously, upon inversion of the curvatures between drum 5 and coupling shaft 15, this disintegration is further increased so that the cloth is freed by gravity of solid substances assembled thereon progressively as these are fragmented and unloosened. The scrapers 42 and 45 finish up the cleaning.

It is thus possible to rapidly effect an efficient filtration and separation of a solid contained in a liquid comprising a deposited cake having a small thickness which is an improvement factor in the yield as far as time is concerned.

As far as disposal of the filtrate is concerned, belt 12 is provided, opposite each alveole 13, with a lateral pipe 50 communicating by crossing of a marginal rim of the belt with an internal ribbed space of the alveole and with a draining trump 51 which projects laterally. Such a trump 51 is caused to penetrate into a collecting gutter 52 located on the side of drum 5 at a short distance from its corresponding side, such a gutter comprising a convex upper semi-circular channel surmounting a spout 53 forming a large funnel provided at its base with a concave channel and an evacuation tube 53a. This spout embraces the oblique paths of the belt between drum 16, 17 and drum 15, 17a.

As far as driving the movable components is concerned, a system 54 is provided comprising a motor, a speed varying device and a reducer which actuates a shaft 55 carrying a pinion 56 meshing with a crown 57 integral with drum 5. Through appropriate counter-gearing, this same pinion, for example, can drive a wheel 58 integral with the axis of the coupling shaft 15.

Driving of the belt and cloth can thus be effected through adherence on the drum and the coupling shaft or shafts.

If it is desired to use positive driving for large filters operating under high pressures, in particular, it is possible to make this belt integral with links of lateral chains passing on corresponding sprocket wheels, a set of these wheels or crowns being required to have, at a suitable pitch, notches 59 allowing passage of trumps 50 designed to discharge clear liquid.

Such lateral chains 60 can also be associated, not only with a continuous belt 12, but with a belt consisting of successive components 61 each comprising an alveole 62. Each component 61, instead of having a configuration which is simply rectilinear with a rectangular aspect, can also be shaped in a herring-bone pattern which facilitates engagement and disengagement, especially with respect to the drum.

Of course, in the construction which uses lateral chains 60, the drum comprises sprocket crowns 63 and all the reverse components such as coupling shafts, rollers and others can also have them.

In the construction which uses chains, the driving can be effected using the drum itself, a reversing coupling shaft or both the drum and coupling shaft, the chains themselves providing for a positive and non-extensible transmission from any motor component.

It is self-evident that without departing from the scope of the invention, it is possible to introduce modifications into the forms of application which have just been described. Thus, instead of a valve and gate system such as described above, it might be considered to attribute the distribution under pressure to a device comprising plates provided with port-holes opposite, one of which is driven by the drum and the other is integral with the fixed framework, as is practised, for example, on continuous filters operating under vacuum. Similarly, more particularly, but not exclusively, in the case of a belt formed of independent plates, each alveole might be provided with an individual filtration cloth. Similarly, each independent plate might be led on its external part with one or more rollers. In such a case, collar 7 would be a simple sheet of flexible steel.

What I claim is:

1. Continuous filtration apparatus for the separation of solids from a liquid mixture in which it is loaded comprising a rotary drum having a plurality of uniformly spaced orifices in its peripheral wall through which a loaded liquid under pressure is fed, an endless belt of filter material, an endless alveolar belt having a plurality of cells spaced apart corresponding to the distance between orifices in said drum, means for circulating said filter belt and said alveolar belt in a loop passing in part over a portion of said rotary drum, said filter belt being arranged to contact the surface of said drum and said alveolar belt arranged to contact the surface of said filter belt, and means for pressing said alveolar belt and filter belt against said rotary drum comprising a collar formed of a flexible and elastic band and a plurality of rollers mounted between said band and said belts, to exert a uniform centripetal compressive force to said belts.

2. The apparatus according to claim 1 including means for tensioning said collar about said drum.

3. The apparatus according to claim 2 wherein said band is held at one end and resiliently pulled at the other.

4. The apparatus according to claim 1 including means for feeding loaded liquid sequentially to each of said orifices.

5. The apparatus according to claim 4 wherein said rotary drum has a central axial chamber for receipt of said loaded liquid, ducts leading from said chamber to the peripheral orifices, and means connecting said chamber to a source of loaded liquid under pressure including valve means selectively connecting said ducts to said chamber as a function of the rotation of said drum.

6. The apparatus according to claim 5 wherein said valve means comprises a compressed air valve associated with each of said ducts and connected to a source of fluid under pressure through a manifold, said valves being actuated by a piston adapted to engage a cam rotating with said drum, and includes a compressed air control gate adapted to intercept the loaded liquid associated with the respective duct.

7. The apparatus according to claim 1 wherein said means for pressing said belts includes an expandable bladder surrounding said collar, and a fixed envelope surrounding said bladder.

8. The apparatus according to claim 7 including means for selectively inflating and deflating said bladder.

9. The apparatus according to claim 1 in which the filter belt and the alveolar belt leave the perimeter of the rotary drum along spaced paths, said filter belt separating from said alveolar belt to eject the solid material deposited thereon.

10. The apparatus according to claim 1 including exhaust channels for the flow of separated liquid arranged along the side edges of said alveolar belt and collection means for removal of said separated liquid from said channels.

11. The apparatus according to claim 1 including scraper means for cleaning the surface of said drum, said scraper means being arranged at that portion of said drum free of said belts.

12. The apparatus according to claim 1 including second scraper means engaging said filter belt to remove said solid.

13. The apparatus according to claim 1 including an endless chain conveyor supporting said alveolar belt and means for indexing said conveyor to present each cell of said belt sequentially to a respective orifice.

14. The apparatus according to claim 13 wherein said alveolar belt comprises a plurality of independent cell members secured to said chain conveyor.

15. The apparatus according to claim 14 wherein said alveoles are chevron shaped.

16. The apparatus according to claim 1 including means for washing said filter belt on leaving said drum.

* * * * *